Patented Nov. 2, 1943

2,333,453

UNITED STATES PATENT OFFICE 2,333,453

AUTOMOTIVE BRAKE

Sydney G. Tilden, Stewart Manor, N. Y.

No Drawing. Application April 15, 1942,
Serial No. 439,083

7 Claims. (Cl. 188—251)

This invention relates to automotive brakes and more particularly to improved bonders to effect attachment of the friction material segment to the brake shoes.

It is known that automotive brakes used on passenger cars, trucks, buses and airplanes utilize brake bands or brake shoes, to either of which are attached segments of friction material and which lined shoes or bands expand or contract against a brake drum in rubbing contact, thus furnishing—through friction—the means necessary to convert the kinetic energy of the vehicle in motion into heat energy. In the past, such friction material segments have been secured to the brake bands or brake shoes by rivets or bolts, the heads of which have been countersunk below the surface of the friction material liner. The usefulness of such a segment, however, terminates when worn to the point at which the heads of the rivets or bolts are exposed and contact the surface of the brake drum.

Attempts have been made to eliminate such mechanical means of attachment and to fasten the friction material to the brake shoes by means of an interposed adhesive. The elimination of rivets or bolts is a distinct improvement in the art, permitting use of the entire thickness of the friction material segment for braking service, without possibility of the brake drum being scored by contact with rivets or bolts. Compounds of a synthetic resinoid have been used for this purpose and thus I have found them somewhat adaptable, since after polymerization the resinoid bond produced is insoluble, infusable and quite strong. It has been found, however, that such a resinoid bond is extremely brittle and may be fractured by either the normal flexing of the brake shoe in actual braking service, or by a shock such as might result from the accidental dropping of a lined brake shoe on a concrete floor.

Furthermore, the surface of the brake shoe adapted to receive a friction material segment is usually not a reasonably smooth and accurate cylindrical surface and this imperfection is especially present in the case of steel brake shoes which have been formed by rolling or stamping, where the cylindrical surface is not machine finished afterwards.

Therefore, in attempting to secure a rigid segment of friction material to the imperfect cylindrical surface of the brake shoe by means of an adhesive, I have found it advisable to insert between the two surfaces, a cushioning bonder in the form of a thin sheet of flexible and compressible material which will adapt itself to the irregularities of the brake shoe and liner. Such a shim or bonder, composed of a rubber bonded asbestos sheet packing material of a thickness between 0.015" and 0.025", is suitable for this purpose.

This improvement consists in such an intermediate bonder of sheet packing material which serves a threefold purpose, namely: (1) to compensate for the surface irregularities of the brake shoe, (2) to provide a flexible cushion between shoe and liner, permitting considerable distortion and shock before the bond fractures, and (3) to provide a vehicle to carry the resinoid adhesive. By coating the sheet packing with an alcohol solution of the resinoid in its alpha stage and then evaporating out the volatile solvent, a dry, hard coating of the resinoid remains on the surface. When thus coated and dried, the sheet is ready for use in relining brake shoes. Although I prefer to modify the resinoid with a suitable plasticizer as later described, the sheet packing material bonder being soft and flexible, gives a bond of satisfactory flexibility to withstand normal shock and shoe distortion.

The method of conveying the adhesive to the surfaces to be joined by means of a coating applied to an intertie or tie-ply bonder has additional advantages, to wit:

(1) The amount of adhesive placed between the surfaces to be bonded is predetermined by the thickness of the resinoid coating applied to the sheet packing, thus a quantity sufficient to complete the bond is assured and waste is eliminated.

(2) A dry sheet inter-tie is clean to handle and readily salable.

(3) Resin in its dry form, such as it is in the coating, is more stable and will not of itself progress to its beta and gamma stages as quickly as it will in an alcohol solution. (In its beta stage, the resin has polymerized sufficiently to impair its value as an adhesive. In the gamma stage, the resin has fully polymerized and is valueless for further use as an adhesive.)

For the coating of resinoid to be applied to surfaces of the sheet material, I prefer to use an alcohol solution of a phenol formaldehyde resinoid modified by a suitable plasticizer and typical and illustrative formulae which may be followed in preparing this solution follow, in which all parts indicated are by weight:

*Example 1*

| | Per cent |
|---|---|
| Phenol | 23.8 |
| Formaldehyde | 7.6 |
| Denatured alcohol | 63.6 |
| Castor oil | 5.0 |
| Total | 100.0 |

Example 2

| | Per cent |
|---|---|
| Phenol | 20.0 |
| Formaldehyde | 6.4 |
| Denatured alcohol | 53.6 |
| Dibutyl phthalate | 20.0 |
| Total | 100.0 |

Example 3

| | Per cent |
|---|---|
| Phenol | 20.0 |
| Formaldehyde | 6.4 |
| Denatured alcohol | 53.6 |
| Tricresyl phosphate (ortho free) | 20.0 |
| Total | 100.0 |

Another improvement consists in providing a sheet material bonder of greatly improved mechanical strength, particularly a material able to withstand the high operating temperatures occasionally incurred by brake shoes without decomposing or suffering great loss of mechanical strength.

It is to be expected that the friction material segments and brake shoes or bands to which they are attached will run hot in use and if adhesive means of attachment is used, such means must be able to withstand the temperatures developed at the point of contact between friction material segment and brake shoe which occasionally reach 500° F. I have found that the commercially available rubber bonded asbestos sheet packing loses its strength very rapidly when subjected to temperatures of 400° F. and over, and no longer has the internal strength necessary to resist the forces tending to slide the friction material liners on the brake shoes under a brake torque. This is so serious that the use of such a bonder might prove disastrous if failure occurred, permitting the friction material segments to come off the brake shoes, when the vehicle was descending a hill, since the brakes might be rendered suddenly useless.

I have made many attempts to increase the shear strength of such sheet material and from studies of many samples I have tested, I have found that failure of the bonder starts in the rubber compound which disintegrates under heat and loses its hold on the asbestos fibers. The material is composed of rubber, asbestos, and a suitable inert filler, formed in sheets on a hot roll mill, as is well known to the art. To this mix there is added free sulphur in an amount sufficient to permit partial vulcanization of the rubber, so that in the process of manufacture the rubber is vulcanized to the degree desired, by control of the temperature and pressure of the mill rolls, and the finished article of manufacture is flexible, pliable and somewhat compressible. Only enough sulphur is added to the mix to permit the degree of vulcanization desired. Material of this composition and manufacture when used to bond friction material segments to brake shoes has, I have found a shear strength of 350 to 400 pounds per square inch after subjection to a temperature of 375° F. for 30 minutes to cause polymerization of the resinoid coating and attachment of the friction material segments. While I have found this to be sufficient to resist brake torque forces of actual service, further subjection of the sheet material bonder to the 500° F. temperature, encountered in actual service for an additional 30 minutes, reduces its shear strength to 200 to 225 pounds per square inch, which I find is not sufficient to hold the segment in place under unusually severe service.

I have found, however, that if a relatively large amount of sulphur is added to the mix at the time the sheet is manufactured, the excess over that amount required to permit the degree of partial vulcanization desired will remain as free sulphur in the rubber compound. Thus when, at a later time, the material is interposed between a brake segment and brake shoe as a bonder and is subjected to further heat and pressure, there is still present in the rubber a sufficient amount of free sulphur which will permit continued vulcanization of the rubber and greatly delay its disintegration, so that little reduction in mechanical strength of the bond takes place.

Suitable, typical and illustrative formulae which may be followed in making the improved sheet material bonder intended to be coated with a resinoid adhesive as described and to be used to attach friction material segments to brake shoes and which will resist such higher temperatures, follow, in which all parts indicated are by weight, with a general formula of—

| Rubber | from 20 to 10 |
|---|---|
| Asbestos | from 80 to 60 |
| Sulphur | from 10 to 1 | and

| Filler | from 30 to 0 |
|---|---| and special forms as:

Example 4

| | Per cent |
|---|---|
| Rubber | 10 |
| Asbestos | 80 |
| Sulphur | 5 |
| Inert fillers | 5 |
| Total | 100.0 |

Example 5

| | Per cent |
|---|---|
| Rubber | 20 |
| Asbestos | 60 |
| Sulphur | 10 |
| Inert fillers | 10 |
| Total | 100 |

Example 6

| | Per cent |
|---|---|
| Rubber | 15 |
| Asbestos | 70 |
| Sulphur | 3 |
| Inert fillers | 12 |
| Total | 100 |

The composition shown in Example No. 6 is the one preferred and samples which I have tested made up according to this formula show a shear strength of 500 to 560 pounds per square inch after heating at 375° F. for thirty minutes to cause polymerization of the resin coating, and attachment of the friction material segment, and a shear strength of from 475 to 500 pounds per square inch after further heating at a temperature of 500° F. for an additional thirty minutes. Thus my improved sheet material, containing an excess of free sulphur, is materially stronger than similar material made up with normal sulphur content, and will actually withstand temperatures of over 500° F. with very little loss in shear strength and is thus greatly superior for use in bonding brake friction material segments to brake shoes.

The preferred method of operation is as follows:

In the preferred embodiment of my invention, I attach brake friction material segments to brake shoes by means of an inter-tie or tie-ply sheet of rubber bonded asbestos of the chemical composition listed in Example 6, manufactured on a hot roll "sheeter" well known to the trade; coat the sheet (by dipping, painting or spraying) with a film of a thickness between 0.0015" and 0.0025" of resinoid prepared according to the preferred formula listed in Example No. 3; air dry the volatile alcohol solvent so that the coating is hard and dry; place the prepared inter-tie sheet material between the brake shoe and friction material segment; clamp the whole together preferably with the device described in co-pending application Serial No. 423,907, filed December 22, 1941, subject the whole to a temperature of 375° F. for a period of thirty minutes; allow the whole to air cool until it can be conveniently handled; and remove the lined brake shoe from the clamping device. By following this method friction material liner has been securely attached to the brake shoe by an infusible and insoluble bond which is insufficiently flexible to permit great distortion of the brake shoe and the bond, as also the inter-tie or tie-ply sheet are sufficiently resisting to high temperatures and other strains and stresses to successfully withstand the most severe and sudden application of the brakes possible.

The brake friction material segments are made principally of asbestos, and the many compositions thereof are well known to the art. They are sometimes called brake liners.

I have described an embodiment of my invention, but changes may be made therein without departing from the spirit of the invention as defined in the appended claims.

I claim as new:

1. A bonder for securing brake friction material to brake shoes of automotive brakes both having opposed mating surfaces, said bonder comprising a material in sheet form composed mainly of rubber and asbestos, flexible and compressible to conform to the curvature and irregularities of said mating surfaces, coated mainly with a dry film of an uncured, plasticized phenol-formaldehyde resinoid, the said bonder being adapted to be clamped under pressure between the said mating surfaces of the brake shoe and brake friction material so that no voids remain therebetween and to secure the brake friction material to the brake shoe by curing the resinoid coating through the application of heat while being subjected to the clamping pressure, the said bonder sheet retaining a sufficient portion of its flexibility and compressibility after curing to resist fracture of the bond under distortion of the brake shoe in service.

2. A bonder for securing brake friction material to brake shoes of automotive brakes both having opposed mating surfaces, said bonder comprising a material in sheet form composed mainly of rubber and asbestos, flexible and compressible to conform to the curvature and irregularities of said mating surfaces, coated mainly with a dry film of an uncured, plasticized phenol-formaldehyde resinoid, the said bonder being adapted to be clamped under pressure between the said mating surfaces of the brake shoe and brake friction material so that no voids remain therebetween and adapted to secure the brake friction material to the brake shoe by curing the resinoid coating through the application of heat while being subjected to the clamping pressure, the said bonder sheet retaining a sufficient portion of its flexibility and compressibility after curing to resist fracture of the bond under distortion of the brake shoe in service, the composition of the rubber in the bonder material to include free sulphur to permit continued vulcanization of the rubber by external heat and pressure applied thereto during its use.

3. A bonder for securing brake friction material to brake shoes of automotive brakes both having opposed mating surfaces, said bonder comprising a material in sheet form composed mainly of rubber and asbestos, flexible and compressible to conform to the curvature and irregularities of said mating surfaces, coated mainly with a dry film of an uncured, plasticized phenol-formaldehyde resinoid, the said bonder being adapted to be clamped under pressure between the said mating surfaces of the brake shoe and brake friction material so that no voids remain therebetween and adapted to secure the brake friction material to the brake shoe by curing the resinoid coating through the application of heat while being subjected to the clamping pressure, the said bonder sheet retaining a sufficient portion of its flexibility and compressibility after curing to resist fracture of the bond under distortion of the brake shoe in service, said dry film resulting from the application of a solution of about 20% phenol, about 6.4% formaldehyde, about 53.6% denatured alcohol, and about 20% ortho-free tricresyl phosphate, all by weight.

4. A bonder for securing brake friction material to brake shoes of automotive brakes both having opposed mating surfaces, said bonder comprising a material in sheet form composed mainly of rubber and asbestos, flexible and compressible to conform to the curvature and irregularities of said mating surfaces, coated mainly with a dry film of an uncured, plasticized phenol-formaldehyde resinoid, the said bonder being adapted to be clamped under pressure between the said mating surfaces of the brake shoe and brake friction material so that no voids remain therebetween and adapted to secure the brake friction material to the brake shoe by curing the resinoid coating through the application of heat while being subjected to the clamping pressure, the said bonder sheet retaining a sufficient portion of its flexibility and compressibility after curing to resist fracture of the bond under distortion of the brake shoe in service, the composition of the rubber in the bonder material to include free sulphur to permit continued vulcanization of the rubber by external heat and pressure applied thereto during its use, said rubber, asbestos, and sulphur being in the proportions of about 15% rubber, about 70% asbestos, about 3% sulphur, with an inert filler of about 12%, all by weight.

5. A bonder for securing brake friction material to brake shoes of automotive brakes both having opposed mating surfaces, said bonder comprising a material in sheet form composed mainly of rubber and asbestos, flexible and compressible to conform to the curvature and irregularities of said mating surfaces, coated mainly with a dry film of an uncured, plasticized phenol-formaldehyde resinoid, the said bonder being adapted to be clamped under pressure between the said mating surfaces of the brake shoe and brake friction material so that no voids remain therebetween and adapted to secure the brake friction material to the brake shoe by curing the resinoid coating through the application of heat while being subjected to the clamping pressure, the said bonder sheet retaining a sufficient portion of its flexibility and compressibility after curing to resist fracture of the bond under distortion of the brake shoe in service, the composition of the rubber in the bonder material to include free sulphur to permit continued vulcanization of the rubber by external heat and pressure applied thereto during its use, said rubber, asbestos, and sulphur being in the proportion of 20 to 10% of rubber, 80 to 60% of asbestos, ten to three percent of sulphur, all by weight.

6. A bonder for securing brake friction material to brake shoes of automotive brakes both having opposed mating surfaces, said bonder comprising a material in sheet form composed mainly of rubber and asbestos, flexible and compressible to conform to the curvature and irregularities of said mating surfaces, coated mainly with a dry film of an uncured, plasticized phenol-formaldehyde resinoid, the said bonder being adapted to be clamped under pressure between the said mating surfaces of the brake shoe and brake friction material so that no voids remain therebetween and adapted to secure the brake friction material to the brake shoe by curing the resinoid coating through the application of heat while being subjected to the clamping pressure, the said bonder sheet retaining a sufficient portion of its flexibility and compressibility after curing to resist fracture of the bond under distortion of the brake shoe in service, the composition of the rubber in the bonder material including free sulphur to permit continued vulcanization of the rubber by external heat and pressure applied thereto during its use, said film resulting from the application of a solution of about 20% phenol, about 6.4% formaldehyde, about 53.6% denatured alcohol, and about 20% ortho-free tricresyl phosphate, said rubber, asbestos and sulphur, being in the proportion of about 15% rubber, about 70% asbestos, about 3% sulphur, with an inert filler of about 12%, all by weight.

7. A bonder for securing brake friction material to brake shoes of automotive brakes both having opposed mating surfaces, said bonder comprising a material in sheet form composed mainly of rubber and asbestos, flexible and compressible to conform to the curvature and irregularities of said mating surfaces, coated mainly with a dry film of an uncured, plasticized phenol-formaldehyde resinoid, the said bonder being adapted to be clamped under pressure between the said mating surfaces of the brake shoe and brake friction material so that no voids remain therebetween and adapted to secure the brake friction material to the brake shoe by curing the resinoid coating through the application of heat while being subjected to the clamping pressure, the said bonder sheet retaining a sufficient portion of its flexibility and compressibility after curing to resist fracture of the bond under distortion of the brake shoe in service, said dry film of resinoid resulting from the application of a solution of about 20 to about 24 percent of phenol, about 6 to 8% of formaldehyde, about 53 to about 64% of denatured alcohol, and a plasticizer selected from a class of castor oil, or dibutyl phthalate or ortho-free tricresyl phosphate, of about 5 to 20%, all by weight.

SYDNEY G. TILDEN.